(12) United States Patent
Curlier et al.

(10) Patent No.: US 10,487,747 B2
(45) Date of Patent: Nov. 26, 2019

(54) MODULAR ASSEMBLY FOR A TURBINE ENGINE

(71) Applicant: SAFRAN AIRCRAFT ENGINES, Paris (FR)

(72) Inventors: Augustin Curlier, Moissy-Cramayel (FR); Kevin Morgane Lemarchand, Moissy-Cramayel (FR); Nathalie Nowakowski, Moissy-Cramayel (FR); Thomas Alain Christian Vincent, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 478 days.

(21) Appl. No.: 15/306,447

(22) PCT Filed: Apr. 28, 2015

(86) PCT No.: PCT/FR2015/051158
§ 371 (c)(1),
(2) Date: Oct. 24, 2016

(87) PCT Pub. No.: WO2015/166187
PCT Pub. Date: Nov. 5, 2015

(65) Prior Publication Data
US 2017/0044987 A1 Feb. 16, 2017

(30) Foreign Application Priority Data

Apr. 29, 2014 (FR) .................................. 14 53889
Apr. 29, 2014 (FR) .................................. 14 53890
Oct. 3, 2014 (FR) .................................. 14 59530

(51) Int. Cl.
*F01D 25/16* (2006.01)
*F02C 7/32* (2006.01)
(Continued)

(52) U.S. Cl.
CPC .............. *F02C 7/32* (2013.01); *F01D 25/162* (2013.01); *F02C 7/06* (2013.01); *F02C 7/36* (2013.01);
(Continued)

(58) Field of Classification Search
CPC ...... F02C 7/06; F02C 7/32; F02C 7/36; F01D 25/162
See application file for complete search history.

(56) References Cited

U.S. PATENT DOCUMENTS 2,932,443 A 4/1960 Gunberg
3,226,987 A * 1/1966 McCarty .................. F02C 7/32
74/15.63

(Continued)

FOREIGN PATENT DOCUMENTS

| EP | 1 980 732 A2 | 10/2008 |
| FR | 2 882 096 A1 | 8/2006 |
| GB | 2 088 015 A | 6/1982 |

OTHER PUBLICATIONS

International Search Report dated Jul. 28, 2015, issued in corresponding International Application No. PCT/FR2015/051158, filed Apr. 28, 2015, 8 pages.
(Continued)

*Primary Examiner* — Dwayne J White
*Assistant Examiner* — Brian O Peters
(74) *Attorney, Agent, or Firm* — Christensen O'Connor Johnson Kindness PLLC

(57) ABSTRACT

A modular assembly for a turbine engine has an annular bearing support that is configured to be connected to a first anti-friction bearing, which is configured to be fitted around a first shaft of the turbine engine. The modular assembly further includes a second anti-friction bearing configured to
(Continued)

be fitted around a second shaft of the turbine engine, wherein the second shaft is not parallel to said first shaft.

12 Claims, 5 Drawing Sheets

(51) Int. Cl.
  *F02C 7/06* (2006.01)
  *F02C 7/36* (2006.01)
(52) U.S. Cl.
  CPC ...... *F05D 2230/60* (2013.01); *F05D 2230/72* (2013.01); *F05D 2240/90* (2013.01); *F05D 2260/4031* (2013.01)

(56) References Cited

U.S. PATENT DOCUMENTS

| | | | | |
|---|---|---|---|---|
| 4,456,425 A * | 6/1984 | McCarty | ................ | F02C 7/32 403/356 |
| 4,598,600 A * | 7/1986 | Knowles | ............... | F01D 25/162 60/798 |
| 5,349,814 A * | 9/1994 | Ciokajlo | ................ | F02C 7/262 60/226.1 |
| 7,552,591 B2 * | 6/2009 | Bart | ......................... | F02C 7/32 60/792 |
| 8,015,828 B2 * | 9/2011 | Moniz | .................... | F02C 7/275 60/778 |
| 2005/0100258 A1 * | 5/2005 | Brossier | ................. | F01D 25/16 384/477 |
| 2006/0277920 A1 | 12/2006 | Bart et al. | | |
| 2007/0022735 A1 * | 2/2007 | Henry | ..................... | F02C 7/36 60/39.162 |

OTHER PUBLICATIONS

Written Opinion dated Jul. 28, 2015, issued in corresponding International Application No. PCT/FR2015/051158, filed Apr. 28, 2015, 6 pages.
Written Opinion of the International Searching Authority dated Jul. 28, 2015, issued in corresponding International Application No. PCT/FR2015/051158, filed Apr. 28, 2015, 8 pages.
International Preliminary Report on Patentability dated Nov. 1, 2016, issued in corresponding International Application No. PCT/FR2015/051158, filed Apr. 28, 2015, 1 page.

* cited by examiner

MODULAR ASSEMBLY FOR A TURBINE ENGINE

TECHNICAL FIELD

The present invention relates to a modular assembly for a turbine engine, in particular of an aircraft.

PRIOR ART

A turbine engine comprises an engine which, in the case of a double-body turbojet engine, has two shafts, low pressure (LP) and high pressure (HP) respectively, which extend along the longitudinal axis of the turbine engine. The LP and HP shafts are generally tubular and fitted one inside the other.

Driving an item of equipment of the turbine engine using a substantially radial (relative to the longitudinal axis of the turbine engine) countershaft has already been proposed. This is the case in particular when the item of equipment is fitted in a nacelle that surrounds the engine of the turbine engine. The countershaft transmits mechanical power between a shaft of the turbine engine and an item of equipment such as an accessory gear box (AGB). This countershaft is driven in rotation through a set of bevel pinions or gears. A countershaft bevel gear is integral in rotation with the HP shaft and is in mesh with a second bevel gear or pinion that is fitted to a radially inner extremity of the countershaft.

The applicant's application EP-A1-1 813 792 describes bevel pinions or gears of this type.

Using another countershaft to take off power from the engine in order to drive another item of equipment of the turbine engine, such as an electric generator, has already been envisaged.

Studies have shown that an additional take-off of power from the HP shaft reduces the pumping range of the HP compressor and could be too restrictive from a performance and operability point of view. The power take-off should therefore be effected from the LP shaft using an additional set of bevel pinions or gears.

In a known fashion, the radial shaft that is used to take off power from the HP shaft extends inside a substantially radial dihedral hollow arm of an intermediate casing of the turbine engine. The intermediate casing is disposed between LP and HP compressors of the turbine engine, and its arms extend inside the air flow duct between these compressors.

The radial shaft that would be used to take off power from the LP shaft should likewise extend inside a hollow arm of the intermediate casing and could be situated with the first radial shaft substantially within a single transverse plane.

As can be seen in FIG. 1, a countershaft bevel gear 10 is fitted in the vicinity of an upstream extremity of the HP shaft 12. As described above, this gear 10 is in mesh with a bevel pinion of a first countershaft that is not shown in FIG. 1.

The HP shaft 12 surrounds the LP shaft 14 which extends in an upstream direction beyond the HP shaft 12. The upstream extremity part of the LP shaft 14 is surrounded by a downstream extremity part of a fan shaft 16.

The second countershaft 18 carries a bevel pinion 20 that is meshed with a countershaft bevel gear 22 fitted to the fan shaft 16. The countershaft gear 22 is driven in rotation by the LP shaft 14 by means of the fan shaft 16.

The shafts of the turbine engine are centered and guided in rotation by means of anti-friction bearings. The countershaft gear 22 is here fitted downstream of a roller bearing 24, the outer ring of which is fixed to a bearing support 26 fixed to a stator 33 of the turbine engine. The inner ring of the bearing 24 is fitted to the fan shaft 16 and bears axially through its upstream extremity on an annular shoulder of this shaft. A nut 28 is screwed onto the downstream extremity of the fan shaft 16 and bears axially on the countershaft gear 22 which bears axially on the inner ring of the bearing 24 in order to urge it against the aforementioned shoulder of the shaft 16.

The pinion 20 comprises a cylindrical portion 29 that is fitted to the radially inner extremity of the countershaft 18 and which is guided in rotation by two coaxial anti-friction bearings 31. The inner rings of these bearings 31 are fitted to this portion 29 and its outer rings are borne by a member fixed to the stator of the turbine engine.

This architecture has some disadvantages related to the fitting and to the quality of the transmission between the LP shaft 14 and the countershaft 18.

During fitting, the different modules of the turbine engine are generally assembled by axial engagement of a module in or on another module. Thus, the fan module is assembled by axial engagement of the fan shaft 16 on the LP shaft 14, until the countershaft bevel gear 22 meshes with the pinion of the countershaft 18. However, given the configuration and the diameters mentioned above, this fitting is complex and can result in damage to the teeth of the pinion 20 and those of the gear 22.

However, the bearing support 26, the countershaft gear 22, the pinion 20, the bearing support member 31, etc., do not form a turbine engine module but are on the contrary fixed and fitted independently of one another. Conversely, a module or modular assembly for a turbine engine should be understood in this application as being an assembly of parts that cooperate with one another so that they can be fitted en bloc into the turbine engine. In other words, this module or modular assembly can be assembled before it is fitted into the turbine engine.

Lastly, the axial position reference of the fan shaft 16 is situated at a thrust bearing 30 that is situated upstream of, and very distant from, the area of tooth contact of the pinion and the countershaft gear 22. Because of the mechanical deformation, thermal expansion, and manufacturing and assembly tolerances, the relative positions of the pinion 20 and the gear 22 are not controlled. The quality of the contact between the teeth of the pinion 20 and those of the gear 22 and the lifespan of the teeth are therefore no longer assured.

Although this cannot be seen in FIG. 1, the tooth contact for the power take-off from the HP body is situated in proximity to a thrust bearing that is situated directly downstream of the countershaft gear 10, which contributes to the quality of the transmission (very small amounts of axial and radial displacement).

The prior art also comprises documents GB-A-2 088 015 and EP-A2-1 980 732.

The present invention proposes a simple, effective and economical solution to at least part of the problems described above.

DESCRIPTION OF THE INVENTION

For this purpose, the invention proposes a turbine engine comprising a modular assembly, a fan shaft and fan shaft guide bearings, the modular assembly having an annular bearing support, said annular support comprising means for connection to at least a first anti-friction bearing fitted around said fan shaft, characterised in that said annular support comprises means for connection to at least a second anti-friction bearing configured to be fitted around a second shaft of the turbine engine not parallel to said first shaft, and in that said annular support comprises means for connection to an intermediate casing of the turbine engine.

The invention makes it possible in particular to simplify the fitting of a turbine engine for which modular or en bloc fitting is permitted.

The turbine engine according to the invention can comprise one or more than one of the following features, taken separately from one another or in combination with one another:

said bearing support comprises means for connection to a third anti-friction bearing configured to be fitted around said second shaft of the turbine engine;
said bearing support comprises means for connection to a fourth anti-friction bearing configured to be fitted around said first shaft;
said first and fourth bearings are connected to the inner periphery of the bearing support;
said fourth bearing has an inner ring fitted around a substantially cylindrical sleeve around which there is also fitted a countershaft bevel gear that is configured to be in mesh with a bevel pinion comprising a cylindrical portion surrounded by said second bearing, and possibly said third bearing, and configured to be fitted to, or to form, a longitudinal extremity of said second shaft;
the bevel gear is gripped axially against said inner ring by means of a nut screwed on said sleeve;
said first bearing comprises an inner ring with a cylindrical extension around which is fitted said sleeve which comprises internal splines complementary to external splines of said extension;
said countershaft gear extends substantially within a plane transverse to an axis of revolution of the bearing support, which is substantially parallel to said bearing support and/or which passes substantially through said means for connection to said second bearing;
the bearing support is substantially plane or in the general shape of a truncated cone;
said cylindrical extension defines an annular space around the fan shaft, which is configured to receive a nut;
the inner ring of said first bearing is inserted axially between an annular outer rim of the sleeve and said gear;
one of said two bearings has an inner ring fitted around a substantially cylindrical sleeve comprising internal splines, and in that the other of said two bearings comprises an inner ring having a cylindrical extension that is engaged in said sleeve and which comprises external splines complementary to those of said extension;
said bearing support comprises means for connection to two anti-friction bearings configured to be fitted around said second shaft of the turbine engine;
said two bearings are connected to the inner periphery of the bearing support;
a countershaft bevel gear is fitted around said sleeve and is configured to be in mesh with a bevel pinion comprising a cylindrical portion surrounded by said at least one bearing, and configured to be fitted to, or to form, a longitudinal extremity of said second shaft;
said countershaft gear extends substantially within a plane transverse to an axis of revolution of the bearing support, which is substantially parallel to said bearing support and/or which passes substantially through said means for connection to said at least one bearing;
the bearing support is substantially plane or in the general shape of a truncated cone;
said cylindrical extension defines an annular space around the fan shaft, which is configured to receive a nut;
the inner ring of said first bearing is inserted axially between an annular outer rim of the sleeve and said gear;
each of said two bearings has an outer ring formed in a single piece with an annular flange for fixing to said bearing support;
the flange of the outer ring of one of the bearings is applied to a radial face of said bearing support, and the flange of the outer ring of the other of the bearings is applied to an opposed radial face of said bearing support;
the extension of the inner ring of the bearing extends axially from the side opposite the side of the bearing support to which the flange of its outer ring is fixed;
the flanges comprise openings for the passage of fixing screws, which are aligned together and with orifices of said bearing support; and
the bearing of which the inner ring is fitted to the sleeve is a ball bearing, and the bearing of which the inner ring comprises an extension is a roller bearing.

The turbine engine can comprise an engine comprising two bodies, a low-pressure body and a high-pressure body respectively, extending along the longitudinal axis of the turbine engine, the low-pressure body having a low-pressure compressor and a low-pressure turbine, the rotors of which are connected to a low-pressure shaft that drives said fan shaft in rotation, the high-pressure body having a high-pressure compressor and a high-pressure turbine, the rotors of which are connected to a high-pressure shaft, the turbine engine also having, between the low-pressure and high-pressure compressors, an intermediate casing connected to said annular support, and wherein the intermediate casing comprises detachable means for fixing to a second annular guide bearing(s) support of said high-pressure shaft.

Said second shaft is preferably a power take-off shaft. Said high-pressure shaft may comprise means for meshing with another power take-off shaft.

The power take-off from the LP shaft makes it possible to reduce the power take-off from the HP shaft and to consider a reduction in the diameter of the HP body, which is advantageous in terms of the bypass ratio of the turbine engine.

The sleeve and the low-pressure shaft are preferably configured so that the fan shaft is fitted by axial engagement between the low-pressure shaft and the sleeve.

The present invention further relates to a method for disassembling a turbine engine as described above, characterised in that it comprises a step of disassembling the means for fixing the second annular support to the intermediate casing, and a step of axial distancing of said assembly and the intermediate casing from the rest of the turbine engine.

DESCRIPTION OF THE FIGURES

The invention will be better understood and other details, features and advantages of the invention will become more clearly apparent on reading the following description, made as a non-restrictive example and with reference to the accompanying drawings in which.

DETAILED DESCRIPTION

Figure 1:
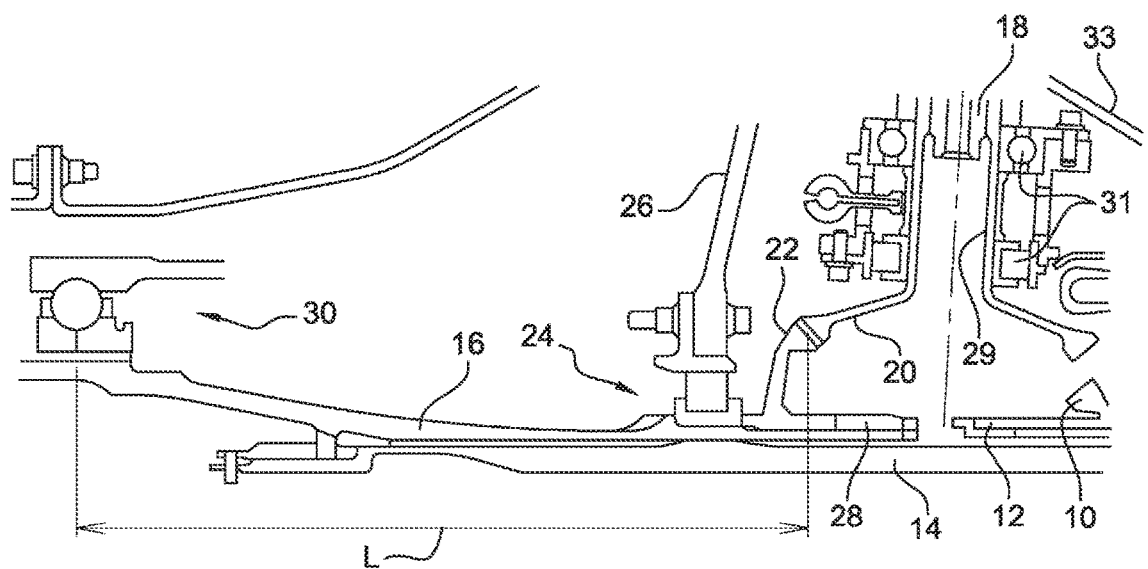
FIG. 1 is a partial diagrammatic half-view in longitudinal cross-section of a turbine engine.
Figure 2:
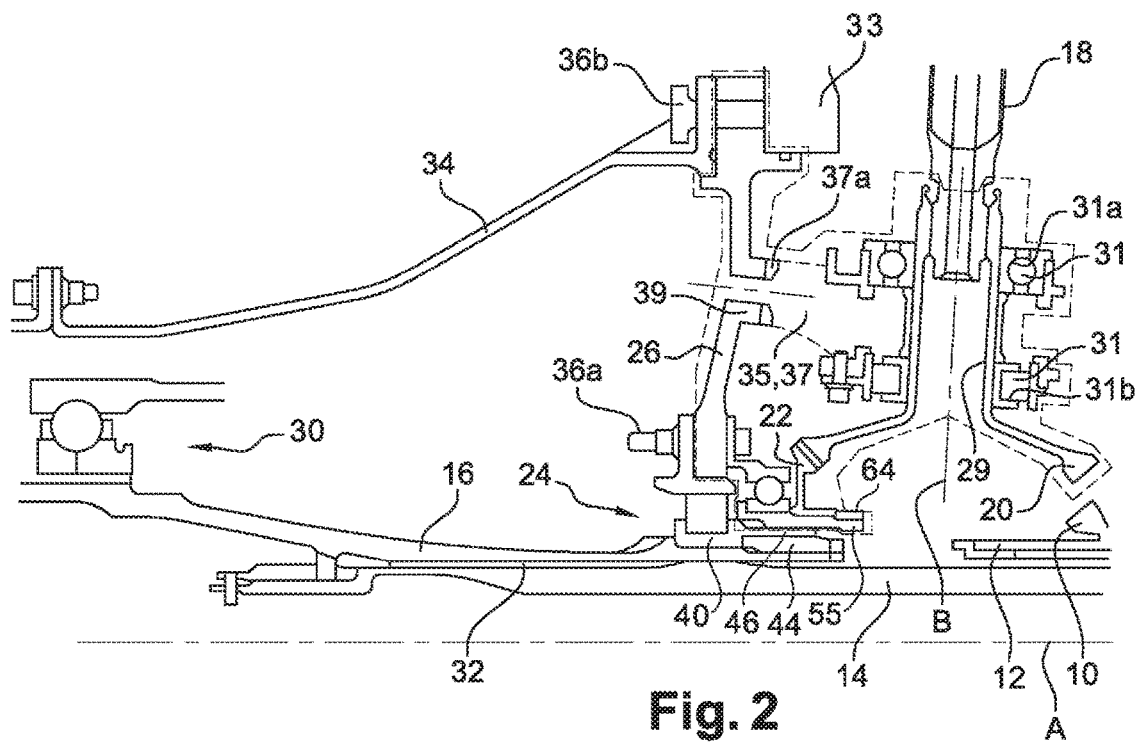
FIG. 2 is a partial diagrammatic half-view in longitudinal cross-section of a turbine engine according to the invention.
Figure 3:
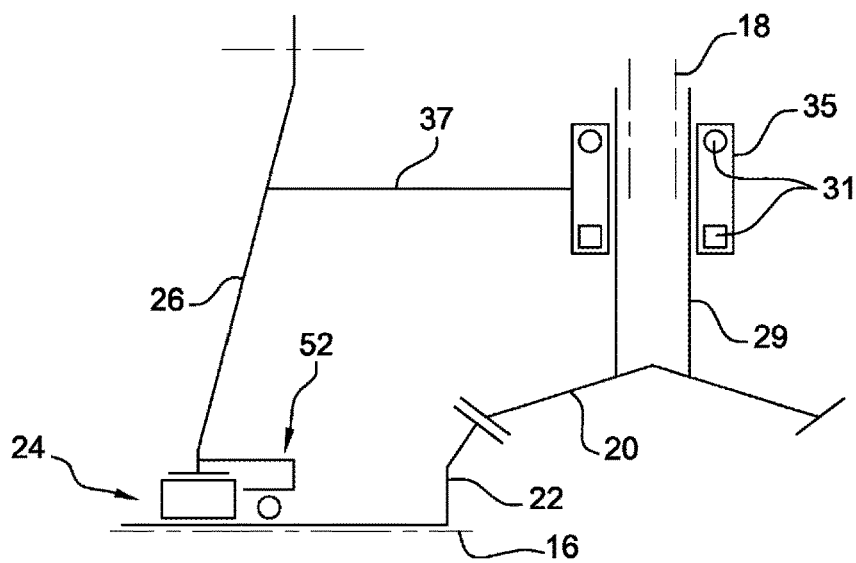
FIG. 3 is a very diagrammatic half-view of a modular assembly according to the invention.
Figure 4:
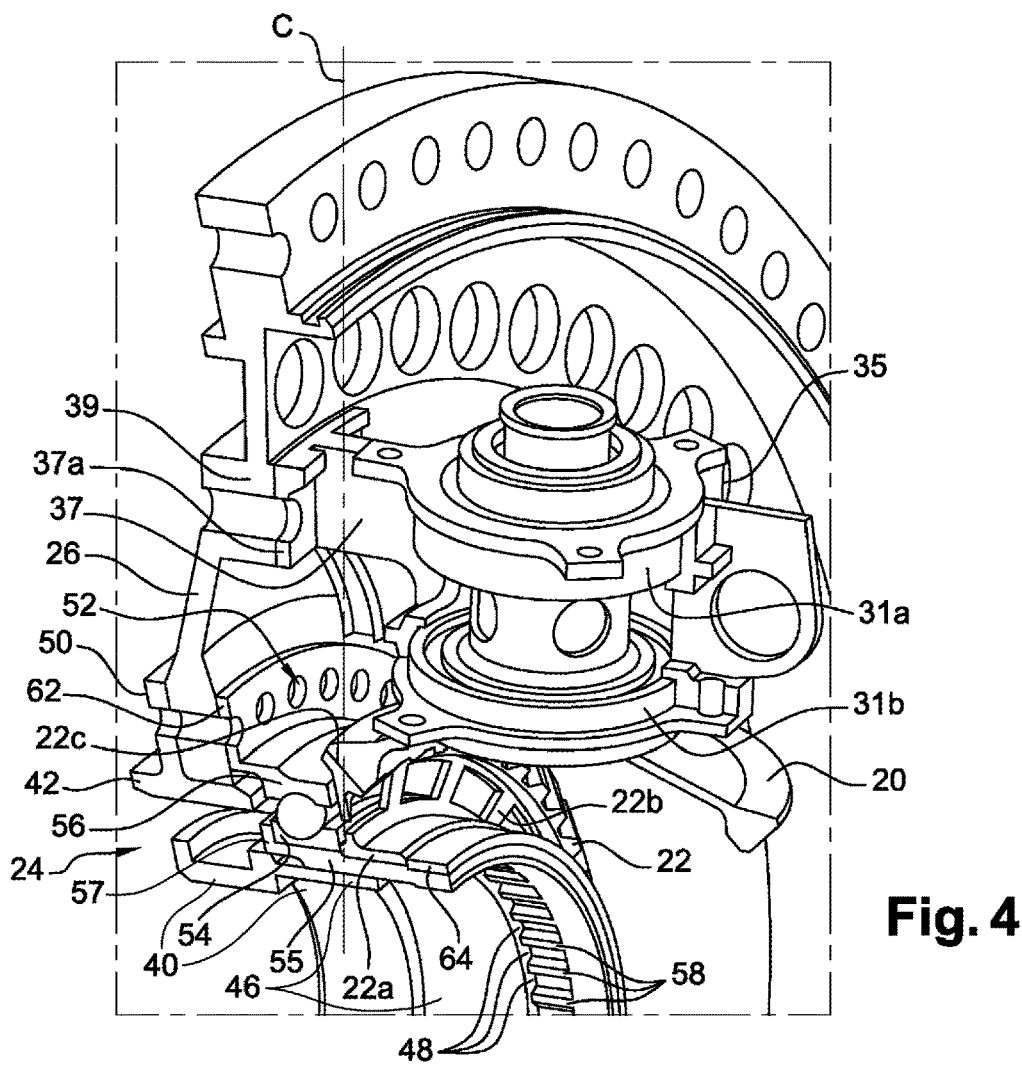
FIG. 4 is a diagrammatic half-view in perspective and in axial cross-section of the modular assembly of FIG. 2.

In FIGS. 2 to 4, which show a first embodiment of the invention, the elements already described above with reference to FIG. 1 are designated by the same reference numbers.

The turbine engine of FIG. 2 typically comprises, from upstream to downstream, in the direction of gas flow, a fan, an LP compressor, an HP compressor, a combustion chamber, an HP turbine, an LP turbine and a combustion gas exhaust pipe.

The rotors of the LP compressor and the LP turbine are integral in rotation and connected to one another by the LP shaft 14 which extends along the longitudinal axis A of the turbine engine. The rotors of the HP compressor and the HP turbine are integral in rotation and connected to one another by the HP shaft 12 which extends along the axis A. The shafts 12, 14 are tubular and fitted one inside the other, the HP shaft 12 of larger diameter extending around the LP shaft 14 of smaller diameter.

The fan comprises a rotor that is connected to the shaft 16 driven by the LP shaft 14. The fan shaft 16 comprises a downstream extremity part that surrounds an upstream extremity part of the LP shaft and which is made integral in rotation with this shaft by a set of splines 32.

Each bearing 24, 30 of the turbine engine comprises an inner ring and an outer ring that between them define a ball or roller bearing race. The inner ring of each bearing is fitted to a shaft and its outer ring is fixed to an annular bearing support 34, 26, which is itself fixed to a stator of the turbine engine. The bearing 30 is a ball thrust bearing and the bearing 24 is a roller bearing. The bearing support 26 is plane and has a substantially radial orientation relative to the axis A, which is an axis of revolution of the support 26.

The outer ring of the bearing 24 is here fixed by a series of axial frangible screws 36a to the inner periphery of the bearing support 26, the outer periphery of which is fixed by another series of axial frangible screws 36b to the stator 33 of the turbine engine. The frangible screws 36a, 36b form radial disconnection means and axial disconnection means respectively. Each disconnection means is intended to break when it is subjected to forces above a predetermined threshold. This is the case, for instance, when a fan blade breaks and is lost.

The turbine engine is equipped with two countershafts of which only one can be seen in FIG. 2. The non-visible countershaft extends substantially radially relative to the axis A, and is used to take off power from the HP shaft in order to drive an item of equipment of the turbine engine, such as an AGB. This drive shaft extends inside a tubular arm of an intermediate casing of the turbine engine, disposed between the LP and HP compressors. The radially outer extremity of the countershaft can be situated in a nacelle of the turbine engine, which surrounds the engine and serves as a fitting compartment for several items of equipment including the AGB.

The radially inner extremity of the countershaft is equipped with a bevel pinion 20 that is in mesh with the countershaft bevel gear 10. The countershaft gear 10 is integral in rotation with the HP shaft 12.

The other countershaft 18 extends substantially radially relative to the axis A and is used to take off power from the LP shaft to drive another item of equipment of the turbine engine, such as an electric generator. This countershaft 18 extends inside another hollow arm of the intermediate casing, which is preferably diametrically opposite that traversed by the first countershaft. The radially outer extremity of the countershaft can also be situated in the nacelle and its radially inner extremity is equipped with the bevel pinion 20 which is in mesh with the countershaft bevel gear 22.

More precisely, the pinion 20 comprises a cylindrical or tubular portion 29 that is fitted to the radially inner extremity of the countershaft 18 and which is guided and centered in rotation about a substantially radial axis B by two anti-friction bearings 31.

The anti-friction bearings 31 are coaxial, of the same diameter and disposed in proximity to one another. A first bearing 31a of the bearings 31, situated radially on the exterior relative to the second, is here a ball bearing. The second bearing 31b is a roller bearing in the example shown.

The inner rings of the bearings 31a, 31b are integral in rotation with the portion 29 of the pinion, and its outer rings are borne by a power take-off housing 35, which serves as a support for the bearings 31 and for the pinion 20 but also as a connection to the bearing support 26.

This is because this housing 35 supports and holds the bearings 31 and also connects them to the bearing support 26, as is shown diagrammatically in FIG. 3. For this purpose, the housing 35 comprises at least one lug 37 for connection to the bearing support 26, which can be seen in FIG. 4. This lug 37 extends substantially axially upstream and comprises at its upstream extremity a flange 37a for fixing to the bearing support 26, for example by nut-and-bolt type means.

The bearing support 26 comprises, on a circumference extending substantially half-way from these radially inner and outer extremities, a boss 39 to which the flange 37a is applied and fixed. This boss 39 extends downstream and comprises a substantially radial downstream face for bearing against the flange 37a.

The countershaft gear 22 is integral in rotation with the LP shaft 14. It is fitted to the fan shaft 16 which is itself fitted to the LP shaft 14. As can be seen in FIGS. 2 and 4, the gear 22 is fitted to the fan shaft 16 by means of a rotating part of a transmission system 38, which is fitted by axial engagement to the fan shaft 16, the transmission system having a fixed part connected, in the example shown, to the bearing support 26 in such a way that the transmission system 38 is held by this bearing support during an operation to remove the fan shaft.

In FIGS. 2 and 4, the references 40 and 42 designate the inner and outer rings of the bearing 24 respectively. The inner ring 40 is fitted to the downstream extremity of the fan shaft 16 and is gripped axially against an annular shoulder of this shaft by a nut 44 that is screwed from downstream onto the downstream extremity of the shaft 16 and bears axially on the ring 40. The ring 40 comprises a cylindrical extension 46 downstream that extends above the nut 44 and which comprises rectilinear external splines 48. As can be seen in FIGS. 2 and 4, the extension 46 of the ring 40 defines an annular space in which at least a part of the nut 44 is fitted, wherein the nut 44 is shown in FIG. 2 and not shown in FIG. 4.

The outer ring 42 of the bearing 24 is connected to an annular outer flange 50 that is applied to an upstream radial face of an annular inner flange of the bearing support 26 and which is fixed to that flange by the frangible screws 36a.

The transmission system 38 comprises an anti-friction bearing 52, here a ball bearing, the outer ring 56 of which is fixed to the bearing support 26 and the inner ring 54 of which is fitted to a sleeve 55 which is itself fitted to the extension 46 of the ring 40.

The sleeve 55 comprises rectilinear internal splines 58 that are complementary to the splines 48, and is fitted to the extension 46 by axial translation from downstream. The sleeve 55 extends beyond the downstream extremity of the extension 46 of the ring 40.

The inner ring 54 bears axially in an upstream direction on an annular outer rim 57 situated at the upstream extremity of the sleeve 55.

The outer ring 56 is connected to an outer annular flange 62 that is applied to a downstream radial face of the inner annular flange of the bearing support 26. The flange of bearing support 26 is thus gripped between the flanges 50, 62 and fixed to these flanges by the aforementioned frangible screws 36a.

The countershaft gear 22 is fitted to the sleeve 55 and is fixed by means of a nut 64 that is screwed from downstream onto the downstream extremity of the sleeve 55 and which bears axially on the gear 22 in order to keep it gripped against the inner ring 54 of the bearing 52, which is itself urged by this nut 64 against the annular rim 57 of the sleeve.

The gear 22 basically comprises three parts: a substantially cylindrical radially inner wall 22a, a substantially radial support wall 22b, and external bevel teeth 22c.

The wall 22a comprises rectilinear internal splines 65 engaged in complementarily-shaped rectilinear external splines of the sleeve 55. The wall 22b extends radially outwards from the upstream extremity of the wall 22a.

As can be seen better in FIG. 4, the countershaft gear 22 and in particular its support wall 22b extends in a transverse plane C that passes through the housing 35 and in particular its lug 37, which enables the axial space requirement of the modular assembly according to the invention to be reduced.

This modular assembly is outlined in FIG. 2 by dotted lines and in the example shown comprises:
  the bearing support 26, the inner periphery of which forms means for connection to a (first) bearing 24, here a roller bearing;
  the pinion 20, the (second and third) bearings 31, and the housing 35 supporting the pinion 20, its bearings 31, and connecting to the bearing support 26, which comprises in particular the lug 37;
  the transmission system formed in particular by the countershaft gear 22, the (fourth) bearing 52, here a ball bearing, also connected to the inner periphery of the bearing support 26, and the sleeve 55.

Before it is fitted into a turbine engine, the modular assembly according to the invention can be assembled as follows.

The bearing 52 is fitted axially to the sleeve 55 by axial translation from downstream, until its inner ring 54 bears axially in an upstream direction on the upstream rim 57 of the sleeve. The gear 22 is then fitted axially to the sleeve 55 by axial translation from downstream, until its splines 58 engage in the splines 48 of the sleeve and until it bears via its wall 22a on the inner ring 54 of the bearing 52. The nut 64 is then screwed onto the downstream extremity of the sleeve 55 in order to axially grip and immobilise the ring 54 and the gear 22. The transmission system 38 equipped with the gear 22 can then be fixed to the bearing support 26, by means of the flange 62 connected to the outer ring 56 of its bearing 52. It is conceivable that the flange 50 of the outer ring 42 can be fitted on and fixed to the bearing support 26, and that the flanges 50, 62 can then be fixed to one another and to the bearing support 26 by the aforementioned frangible screws 36a.

The power take-off housing 35, equipped with the pinion 20 and the anti-friction bearings 31, is then disposed downstream of the bearing support 26 so that the flange 37a of its lug 37 bears on the boss 39 of the bearing support 26, and so that the pinion 20 meshes with the teeth of the gear 22. Nut-and-bolt type means for fixing the flange 37a to the boss 39 are then used to immobilise the housing 35 in that position. The modular assembly according to the first embodiment of the invention is then formed.

The bearing support 26 can then be fixed by its outer periphery to the stator 33 by means of the screws 36b. The LP shaft 14 is then assembled by axial translation from downstream until its upstream extremity is situated upstream of the transmission system 38. As can be seen in FIG. 2, this assembly does not hinder the fitting and removal of the fan shaft 16, as said fan shaft 16 can be fitted axially from upstream in the annular space delimited firstly by the LP shaft 14 and secondly by the outer ring 42 and the sleeve 55. Before this fitting, the fan shaft 16 is equipped with the inner ring 40 and the rollers of the bearing 24 and also with the nut 44 for axially immobilising the ring 40 (FIG. 2). The fan shaft 16 is inserted by axial translation from upstream until the splines 32 of the shafts 14, 16 engage with one another, the rollers of the bearing 24 fit into the outer ring 42, and the splines 48 of the extension 46 of the inner ring 40 of this bearing engage in the splines 58 of the sleeve 55.

Figure 5:
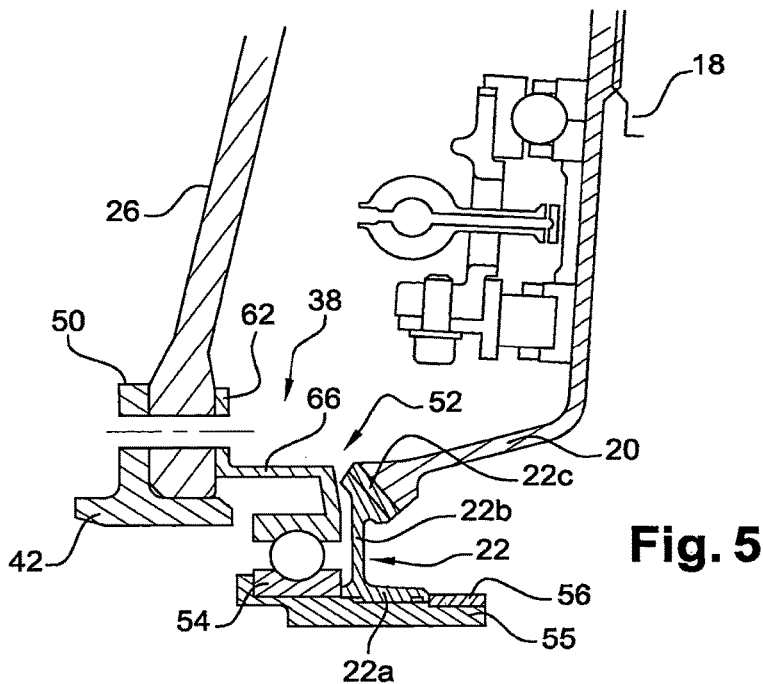
FIG. 5 is a diagrammatic half-view in longitudinal cross-section of a modular assembly according to a variant of the invention.

In the variant shown in FIG. 5, the outer ring 56 of the bearing 52 is connected to the outer flange 62 by a pin 66 with a C- or L-shaped section, this pin being configured to deform plastically in a radial direction, by local radial compression, when it is subjected to radial forces above a certain threshold, corresponding for example to the aforementioned instance of loss of a fan vane.

The sliding connection formed by the splines 48, 58 offers a total axial freedom and does not disrupt the operation of the axial disconnection means formed by the frangible screws 36b situated at the outer periphery of the bearing support 26. The effect on the radial disconnection means formed by the frangible screws 36a situated at the inner periphery of the bearing support 26 is however more problematic. It is necessary to be able to guarantee that the stress path neutralised by this disconnection is not replaced by another passing through the bearing 52. This is prevented by the pin 66 which is able to dampen the aforementioned forces. The bearing 52 thus does not risk transmitting these forces. The pin 66 could be perforated and comprise an annular row of traversing orifices, like a squirrel-cage.

In another variant not shown, it would be possible to incorporate a plurality of bearings into the transmission system 38. This system could for example comprise a ball bearing and roller bearing doublet.

Figure 6:
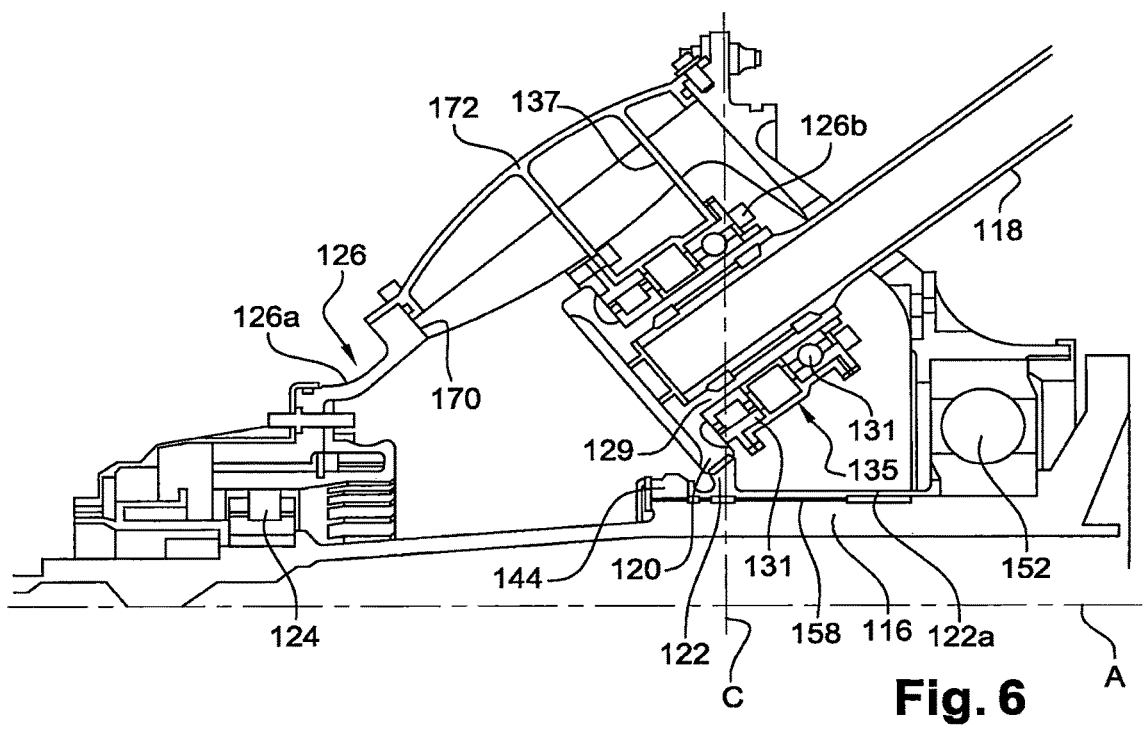
FIG. 6 is a diagrammatic half-view in longitudinal cross-section of a modular assembly according to another variant of the invention.

Reference will now be made to FIG. 6, which shows another variant of the invention and in particular another embodiment of the modular assembly according to the invention. In this figure and in the text that follows, the elements already described above are referred to by the same reference numbers plus one hundred.

The bearing support 126 here has a generally biconic shape with axis of revolution A and comprises two tapered parts, an upstream tapered part 126a and a downstream tapered part 126b. The part 126a extends radially outwards from upstream to downstream and is connected by its outer periphery (or downstream extremity) to the part 126b which extends radially inwards from downstream to upstream.

The part 126a comprises at its inner periphery means for connection to an anti-friction bearing 124, for example by annular fixing flanges. The part 126b comprises at its inner periphery means for connection to an anti-friction bearing 152, for example by means of annular fixing flanges. The bearings 124, 154 are fitted to a fan shaft 116.

The power take-off housing 135 comprises at least one lug 137 for connection to the bearing support 126, and in particular to its part 126a. The part 126 comprises a traversing opening 170 for fitting the housing 135. The lug 137 of the housing 135 comprises at its free extremity a cover 172 for closing the opening 170 and for fixing to the bearing support 126.

As is the case in the first embodiment described above, the housing 35 comprises anti-friction bearings 131 of a cylindrical portion 129 of a pinion 120 that is meshed with a countershaft gear 122 driven by the fan shaft 116. The countershaft 118 has its radially inner extremity fitted into the cylindrical portion 129 and integral in rotation with the pinion 120, for example by means of splines.

Here, the countershaft gear 122 is fitted directly to the fan shaft 116 and its cylindrical inner wall 122c is inserted axially between the inner ring of the bearing 152 and a nut 144 that is screwed onto the shaft 116.

The countershaft gear 122 extends in a transverse plane C that, unlike the first embodiment, does not pass through the lug 137.

The modular assembly comprises, in the example shown in FIG. 6:
   the bearing support 126 which comprises means for connection to a (first) bearing 124, here a roller bearing, and to a (fourth) bearing 152, here a ball bearing; and
   the pinion 120, the (second and third) bearings 131, and the housing 135 supporting the pinion 120, the bearings 131, and connecting to the bearing support 126, which comprises in particular the lug 137.

The bearing 152 is fitted axially to the fan shaft 116 from upstream. The gear 22 is then fitted axially to the shaft 116 by axial translation from upstream, until its splines 158 engage in complementary splines of the shaft 116 and until it bears, through its wall 122a, on the inner ring of the bearing 152. The nut 144 is then screwed onto the shaft 116 to axially grip and immobilise the ring 152 and the gear 122.

The bearing support 126 equipped with the housing 135 and possibly with the bearing 124 can then be fitted to the shaft 116 by axial translation from upstream, until the pinion 120 meshes with the countershaft gear 122. The bearing support 126 is then fixed by flanges. The countershaft 118 can then be fitted blind in the portion 129 of the pinion, through an opening provided in the part 126b of the bearing support 126.

Figure 7:
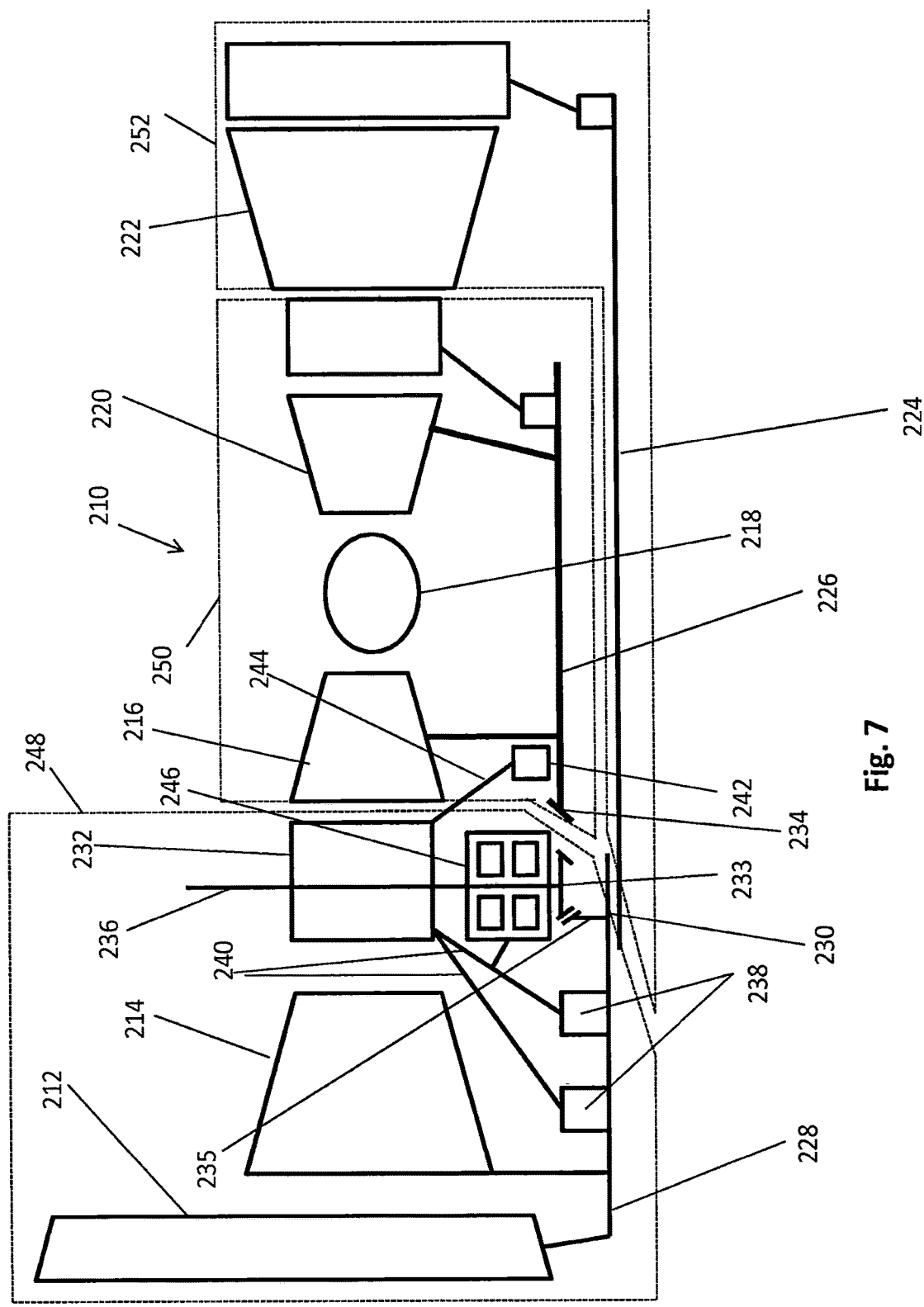
FIG. 7 is a very diagrammatic view showing a turbine engine according to the invention.
Figure 8:
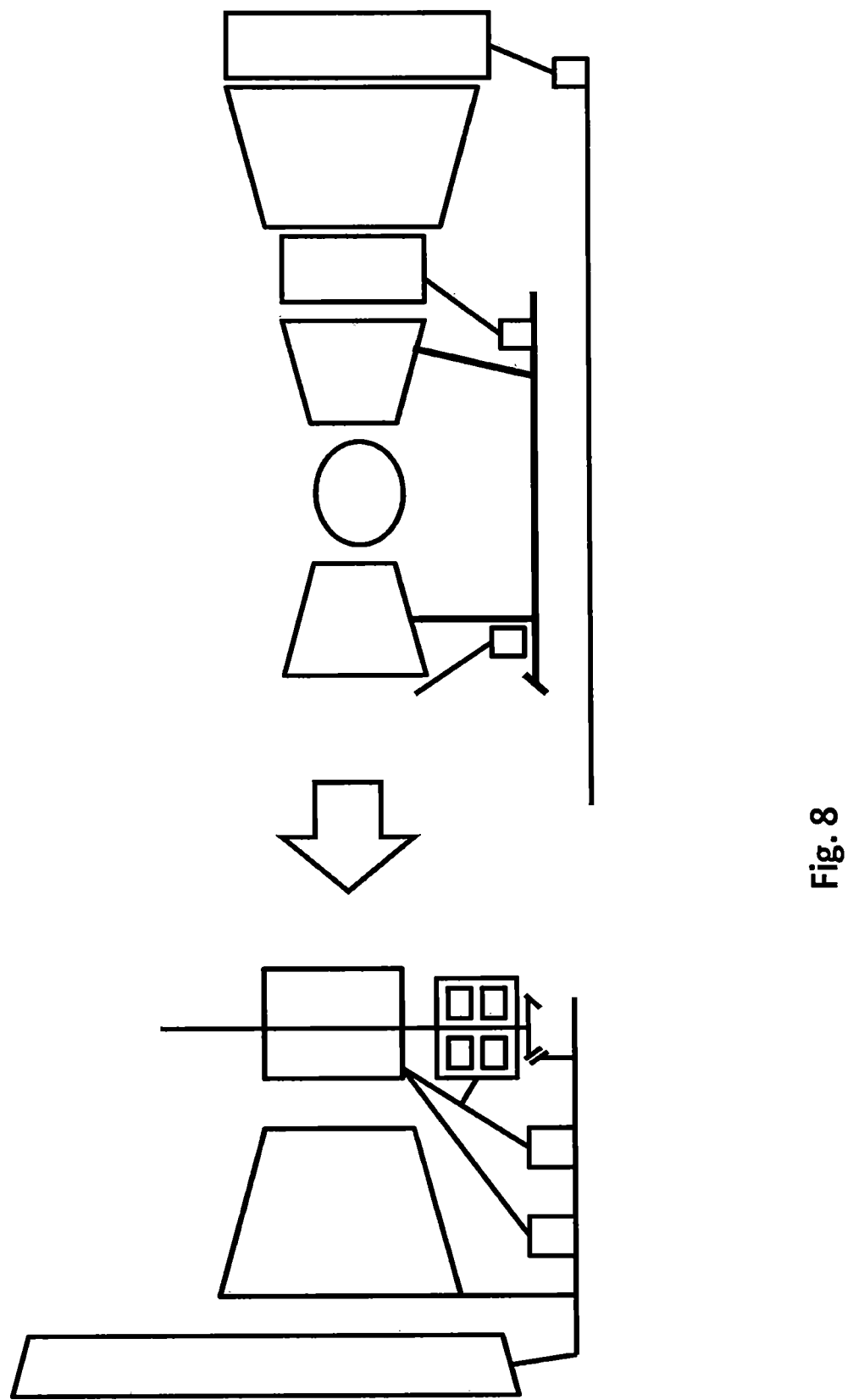
FIG. 8 is a view corresponding to FIG. 7 in which the assembly according to the invention is not fitted to the rest of the turbine engine.

FIGS. 7 and 8 show a turbine engine 210 according to the invention. As in the aforementioned case, the turbine engine 210 comprises a fan 212, an LP compressor 214, an HP compressor 216, a combustion chamber 218, an HP turbine 220, an LP turbine 222 and a combustion gas exhaust pipe.

The rotors of the LP compressor 214 and of the LP turbine 222 are integral in rotation and connected to one another by the LP shaft 224 which extends along the longitudinal axis of the turbine engine. The rotors of the HP compressor 216 and of the HP turbine 220 are integral in rotation and connected to one another by means of the HP shaft 226 which extends along the axis A. The shafts 224, 226 are tubular and fitted one inside the other, the HP shaft 226 of larger diameter extending around the LP shaft 224 of smaller diameter.

The fan 212 comprises a rotor that is connected to the fan shaft 228 driven by the LP shaft 224. The fan shaft 228 comprises a downstream extremity part that surrounds an upstream extremity part of the LP shaft and which is made integral in rotation with that shaft by a set of splines 230.

The turbine engine is equipped with two countershafts or take-off shafts of which only one can be seen in FIGS. 7 and 8. The non-visible countershaft extends substantially radially relative to the axis A, and is used to take off power from the HP shaft 226 in order to drive an item of equipment of the turbine engine, such as an AGB. This countershaft extends inside a tubular arm of an intermediate casing 232 of the turbine engine, disposed between the LP and HP compressors. The radially outer extremity of the countershaft can be situated in a nacelle of the turbine engine, which surrounds the engine and serves as a compartment for fitting a plurality of The radially inner extremity of the countershaft is equipped with a bevel pinion that is meshed with the countershaft bevel gear 234 integral in rotation with the HP shaft 226.

The other countershaft 236 extends substantially radially relative to the axis A and is used to take off power from the LP shaft 224 in order to drive another item of equipment of the turbine engine, such as an electric generator. This countershaft 236 extends inside another hollow arm of the intermediate casing 232, which is preferably diametrically opposite that traversed by the first countershaft. The radially outer extremity of the countershaft can also be situated in the nacelle and its radially inner extremity is equipped with the bevel pinion 233 that is meshed with the countershaft bevel gear 235 integral with the LP shaft.

The guide bearings 238 of the fan shaft are borne by an annular support 240 that is connected to the intermediate casing 232, for example by fixing means, such as an annular flange.

One of the guide bearings 242 of the HP shaft is borne by an annular support 244 that is connected to the intermediate casing 232 by detachable fixing means, such as, for example, an annular flange.

The countershaft 236 is guided in rotation by bearings of a power take-off box 246, which is here connected to the annular support 240 and is without a connection to the annular support 244.

As can be understood, the major fan module 248 can be removed and withdrawn from the major LP module 250 and from the major HP module 252, by disassembling the means for fixing the annular support 244 to the intermediate casing 232 (FIG. 8). The meshing between the countershaft 236 and the LP shaft 224 is maintained in the disassembled position, and the take-off housing 246 also remains connected to the annular support 240 in the disassembled position. This makes it possible, in particular, to facilitate the support of the assembly, relative to the meshing between the countershaft and the HP shaft.

The invention claimed is:

1. A turbine engine comprising a modular assembly, a fan shaft and bearings for guiding the fan shaft, the modular assembly having an annular bearing support, said annular bearing support being connected to at least a first anti-friction bearing fitted around said fan shaft wherein that said annular bearing support is connected to at least a second anti-friction bearing configured to be fitted around a second shaft of the turbine engine not parallel to said fan shaft, and wherein said annular bearing support is connected to an intermediate casing of the turbine engine.

2. The turbine engine according to claim 1, wherein said annular bearing support is connected to a third anti-friction bearing configured to be fitted around said second shaft of the turbine engine.

3. The turbine engine according to claim 1 wherein said annular bearing support is connected to a fourth anti-friction bearing configured to be fitted around said fan shaft.

4. The turbine engine according to claim 3, wherein said first and fourth anti-friction bearings are connected to an inner periphery of the bearing support.

5. The turbine engine according to claim 3, wherein said fourth anti-friction bearing has an inner ring fitted around a cylindrical sleeve around which there is also fitted a countershaft bevel gear that is configured to be in mesh with a bevel pinion having a cylindrical portion surrounded by at least one of said second anti-friction bearing and said third anti-friction bearing, and the bevel pinion being configured to be at least one of (1) coupled to and (2) integrally formed with said second shaft.

6. The turbine engine according to claim 5, wherein the countershaft bevel gear is gripped axially against said inner ring by means of a nut screwed on said cylindrical sleeve.

7. The turbine engine according to claim 5, wherein said first anti-friction bearing comprises an inner ring with a cylindrical extension around which is fitted said cylindrical sleeve which comprises internal splines complementary to external splines of said cylindrical extension.

8. The turbine engine according to claim 5, wherein said countershaft bevel gear extends within a plane transverse to an axis of revolution of the annular bearing support.

9. The turbine engine to claim 1, wherein the turbine engine comprises an engine comprising two bodies, a low-pressure body and a high-pressure body respectively, extending along a longitudinal axis of the turbine engine, the low-pressure body having a low-pressure compressor and a low-pressure turbine, the low-pressure compressor and the low-pressure turbine each comprising a rotor, the rotor of the low-pressure compressor and the rotor of the low-pressure turbine being connected by a low-pressure shaft that drives said fan shaft in rotation, the high-pressure body having a high-pressure compressor and a high-pressure turbine, the high-pressure compressor and the high-pressure turbine each comprising a rotor, the rotor of the high-pressure turbine each comprising a rotor, the rotor of the high-pressure compressor and the rotor of the high-pressure turbine being connected by a high-pressure shaft, the turbine engine also having, between the low-pressure and high-pressure compressors, an intermediate casing connected to said annular support, and wherein the intermediate casing is detachably coupled to a second annular guide bearing(s) support of said high-pressure shaft.

10. The turbine engine according to claim 9, wherein said second shaft is a power take-off shaft.

11. The turbine engine according to claim 10, wherein said high-pressure shaft comprises a first gear configured to mesh with a second gear that is operable coupled to a second power take-off shaft.

12. A method for disassembling the turbine engine according to claim 9, wherein the method comprises a step of uncoupling the second annular support from the intermediate casing, and a step of axial distancing of said modular assembly and the intermediate casing from the rest of the turbine engine.

* * * * *

UNITED STATES PATENT AND TRADEMARK OFFICE
CERTIFICATE OF CORRECTION

PATENT NO. : 10,487,747 B2
APPLICATION NO. : 15/306447
DATED : November 26, 2019
INVENTOR(S) : A. Curlier et al.

Page 1 of 1

It is certified that error appears in the above-identified patent and that said Letters Patent is hereby corrected as shown below:

In the Claims

| Column | Line | |
|---|---|---|
| 11 | 11 | Claim 3, Please change "claim 1" to -- claim 1, --. |
| 12 | 1 | Claim 9, Please change "engine to" to -- engine according to --. |

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*